March 25, 1958 V. J. KOMUCHAR 2,828,012
MECHANISM FOR SEPARATING STONES AND OTHER DEBRIS
FROM POTATOES IN A POTATO HARVESTER
Filed Dec. 2, 1952 2 Sheets-Sheet 1
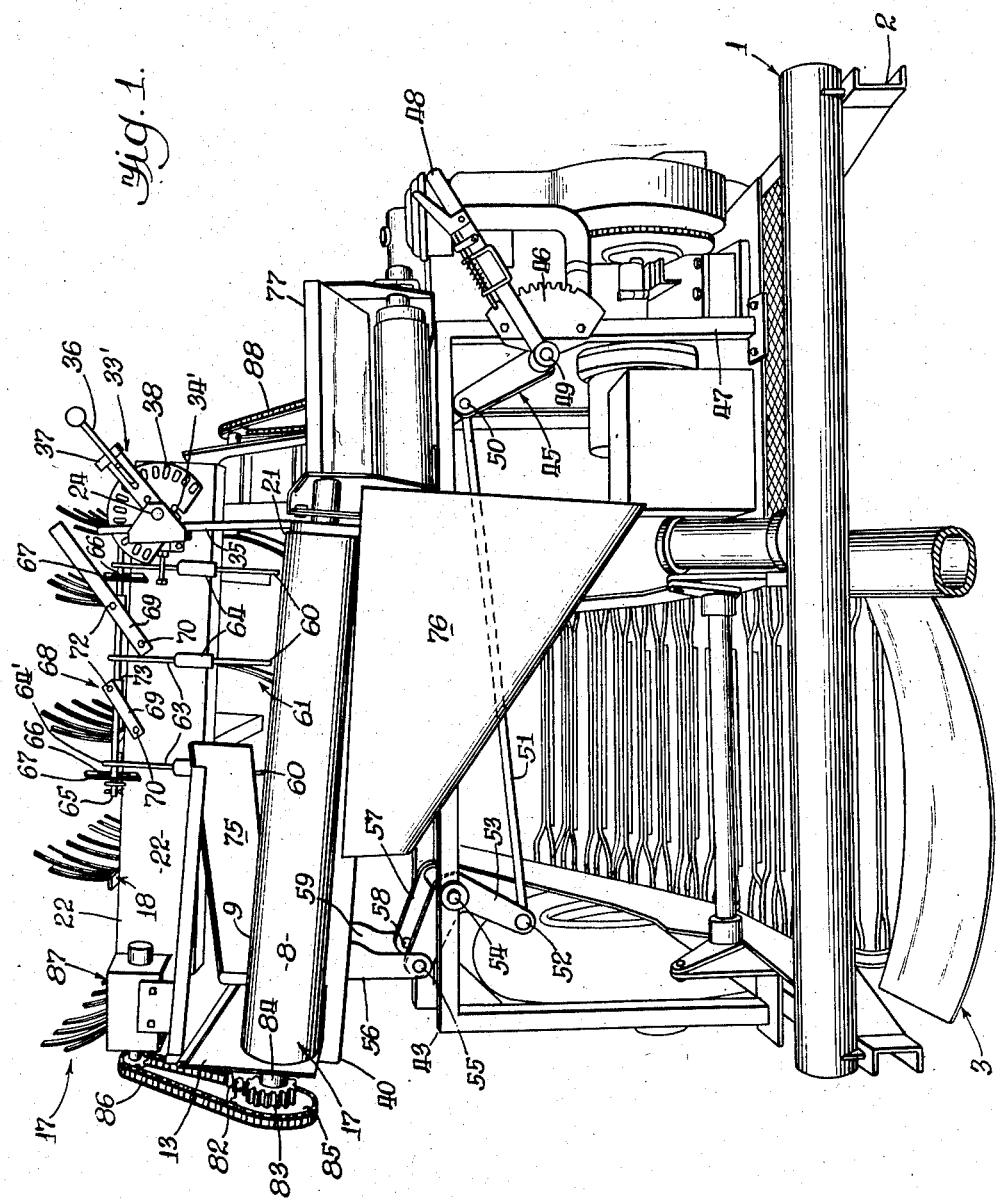
INVENTOR.
Victor J. Komuchar
BY
Paul O. Pipper
Atty.

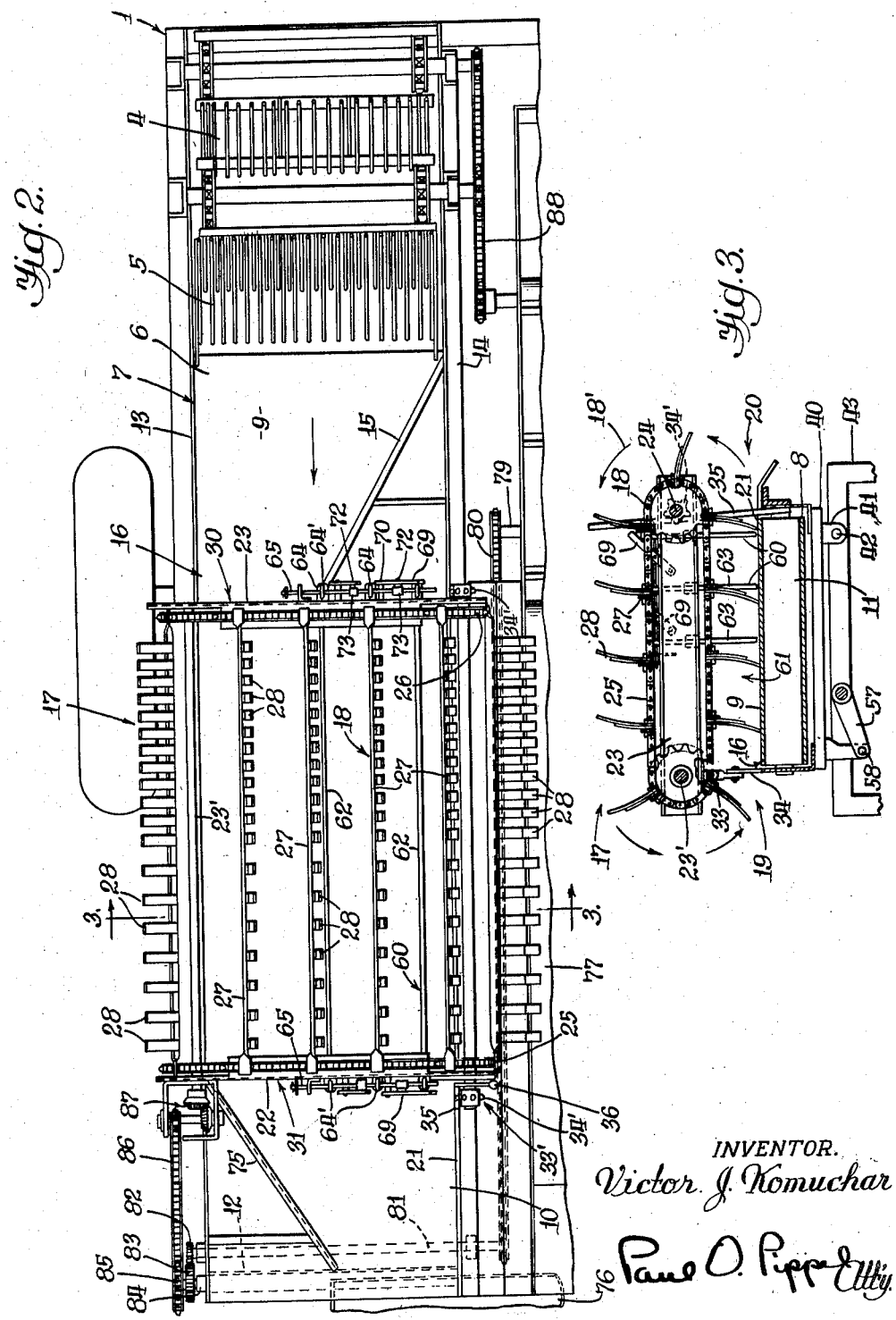

United States Patent Office 2,828,012
Patented Mar. 25, 1958

2,828,012

MECHANISM FOR SEPARATING STONES AND OTHER DEBRIS FROM POTATOES IN A POTATO HARVESTER

Victor J. Komuchar, Brookfield, Ill., assignor to International Harvester Company, a corporation of New Jersey Application December 2, 1952, Serial No. 323,531

15 Claims. (Cl. 209—72)

This invention relates to potato harvesters and more particularly to a novel mechanism for mechanically separating stones, dirt, clods and other debris from harvested potatoes.

A general object of the invention is to devise an efficient mechanical separating means wherein the debris is moved to a separating mechanism which functions to sweep through the debris and roll the potatoes out therefrom.

A more specific object of the invention is to provide such a sorting mechanism incorporating a platform with a moving surface, the platform carrying an endless flay assembly which sweeps transversely thereof over the moving surface to roll out the potatoes from the debris over a series of hurdles so positioned as to accommodate the potatoes to roll thereover while substantially stopping stones, which because of their higher specific gravity than the potatoes and their generally flat nonrolling contours are prevented from vaulting over these hurdles.

A further object of the invention is to devise such a platform which is tiltably mounted longitudinally thereof so as to be adjustable angularly to the horizontal in conformance with the specific field conditions under which the mechanism is operating in order to obtain the most efficient sorting of the potatoes, the tilting of the platform retarding or overcoming the forces tending to hold the potatoes to the platform so as to keep them rolling laterally across the surface for ready separation from the other debris.

A still further object of the invention is to mount the separating means for movement toward and away from the platform surface so as to bring the flails closer or farther from the surface and thus afford a specific adjustment for particular conditions encountered so that the flails operate most efficiently in picking the potatoes out of the debris without sweeping the debris also laterally off the platform.

A further object of the invention is to devise a novel adjustable mounting for the hurdles such that they may be positioned closer or farther away from the platform surface in order to present a greater or lesser obstruction to the movement of the aggregate laterally across the platform and at the same time present minimum retardation to the movement or tumbling of the potatoes thereover thereby effecting an efficient separation of the potatoes from the aggregate.

A still further object of the invention is to devise the flay assembly in such manner that the aggressiveness of the mechanism gradually decreases as the aggregate progressively advances laterally therethrough.

A still further object of the invention is to devise a sorting mechanism incorporating the moving platform surface wherein means are provided to funnel and deposit the aggregate at one end of the platform along one edge thereof so that the aggregate is concentrated along said edge as it is passed under the separator and the separator thus operates upon the aggregate across the entire lateral extent of the moving surface while the said aggregate is being moved through the separator.

These and other objects of the invention will become more apparent from the specification and the drawings wherein:

Figure 1 is a front perspective view of a novel potato harvester incorporating the invention.

Figure 2 is a plan view of the separating mechanism shown in association with fragmentary other parts of the harvester; and, Figure 3 is a cross-sectional view taken substantially on the line 3—3 of Figure 2.

Describing the invention in detail, the potato harvester generally designated 1 comprises a wheeled framework 2 carrying a harvesting mechanism 3 which delivers to an elevator conveyor 4, the latter discharging onto a chute structure 5 which discharges onto one end 6 of a platform conveyor generally designated 7 and comprising an apron 8 having a top run or surface 9 moving in the direction of the arrow toward the opposite end 10. The platform 7 carries the rolls 11 and 12 supporting opposite ends of the apron and said platform having upstanding side shields 13 and 14 extending upwardly above the surface 9 along the lateral edges thereof to confine the material discharged from the chute 5 onto said receiving end 6 of the run 9 of the apron conveyor.

The panel or sideboard 14 carries a baffle or upstanding plate 15 over the top surface 9 at said end 6 and the baffle 15 is angled from the sideboard 14 toward the opposite sideboard 13 in the direction toward the discharge end of the platform conveyor 7. Thus, it will be seen that all of the material deposited on the end 6 of the conveyor will be funneled toward the first lateral edge 16 of the platform conveyor and will thus be concentrated as it passes under the separator or sorting mechanism generally designated 17 which is mounted over the surface 9 and has a flay assembly 18 with an orbital path 18' moving in the direction of the arrow in intercepting relationship to the mass moving thereunder on the surface 9. For purpose of clarity the flay assembly will be designated as having an entering end 19 whereat it begins to sweep over the edge 16 of the table and a leaving end 20 whereat it leaves the second or opposite discharge edge 21 of said surface 9 of the platform conveyor.

The endless flay assembly or sorting mechanism 18 comprises a pair of lateral frames 22 and 23 which mount or rotatably journal adjacent to opposite ends sprocketed shaft assemblies 23' and 24 about which are trained a pair of endless chains 25 and 26 interconnected by a plurality of substantially equally spaced cross-bars 27, 27 and each cross-bar is connected along its length to the inner ends of a plurality of flays 28, 28 which extend outwardly from the assembly and are formed of flexible material such as tire carcass.

It will be seen that the flays or impellers 28, 28 are preferably more closely spaced to each other longitudinally of the bars 27 adjacent to the first end 30 of the separator which is positioned adjacent to the receiving end 6 of said conveyor and that these flays 28, 28 are more widely spaced in the direction toward the opposite end of said flay assembly. The reason for this disposition is to make the flay assembly more aggressive at its intake end 30 than at its discharge end 31 so that the flays will beat up and roll out the potatoes from the aggregate as soon as each new mass increment is entered into the intake end of the separator so that fewer and fewer potatoes remain in the aggregate as each increment passes or moves closer and closer to the discharge end of the sepaartor whereby the function of the more widely spaced flails at the discharge end of the separator is more in the nature of a scavenging action to bat out whatever potatoes may be left without materially disturbing the remaining aggregate such as dirt and stones and the like.

In order to meet varying field conditions wherein at times the potatoes are relatively free from the other aggregate and at times closely packed in with the aggregate or the aggregate may have a clay-like composition, the sorting mechanism is adjustable relative to the surface 9 of the conveyor table, this adjustment comprising a pivotal mounting of each frame member 22 and 23 on a generally horizontal axis 33 by means of depending ears on these frame members connected by pins to the upper ends of upstanding standards 34 carried by the platform 7. It will be seen that the axis of pivot 33 is disposed along the first edge 16 of the platform and that the flay assembly is thus swingable up and down with respect to the surface 9.

The mechanism 33' for swinging the flay assembly up and down comprises the shaft 24 upon which the chain carrying sprockets are rotatably mounted, the shaft 24 being keyed to pinions 34' which mesh within racks 35 upstanding from and carried by the framing of the platform 7 adjacent or along its edge 21. The mechanism 33' includes an arm 36 connected at its inner end to the shaft 24 and having a detent lock 37 cooperatively associated with a quadrant 38 carried on the adjacent frame member 22. It will be appreciated that swinging of the arm member 36 in a downward direction will lower the discharge end 20 of the flay assembly toward the surface 9 and that rotating the arm 36 in an upward direction will of course raise said end 20 from the surface 9. Thus when an extremely heavy mass condition is encountered the flay assembly may be positioned in lowered location and when an extremely light condition is encountered the flay assembly may be disposed in elevated position or in any intermediate location where the field trail will indicate best operation.

The platform or table 7 comprises an underframing 40 with a depending ear 41 adjacent to each end and each ear is pivoted on a substantially horizontal axis as at 42 to an associated frame member 43 upstanding from and connected to the framing 2. These ears 41 and pivots 42 afford an axis of pivot for the table 7 longitudinally thereof that is in the direction or along the direction of movement of the surface 9 at the inboard or discharge edge 21 of the table.

Lateral tilting of the table is effected by an operating linkage generally designated 45 (Figure 1) and comprising a quadrant 46 carried by a frame member 47, the quadrant presenting detent means cooperable with a lock on an operating lever 48 which is pivoted as at 49 at its elbow, the opposite end of the lever 48 being pivoted as at 50 to one end of a rod 51 which at its opposite end is pivoted as at 52 to the lower end of a bell-crank 53 which is pivoted at its elbow by means of a rock shaft 54 to the adjacent frame 43. The opposite end of the bell-crank 53 is pivoted at 55 to the lower end of a depending ear 56 on the framework 40 of the conveyor table 7 at one end thereof. The rock-shaft 54 extends to the other end of frame 43 and is journaled thereon and is rigidly secured to an arm 57 pivoted at its outer end as at 58 to the lower end of a depending ear or lug 59 on the underframe 40 of the table adjacent to its opposite end.

It will be appreciated that rotation of the handle part of the lever 48 in a downward direction (Figure 1) will lower the outboard edge 16 of the platform and that moving said handle portion of the lever 48 in an upward direction will swing the outboard side of the table upwardly.

The lateral tilting of the table is effectual to coordinate the action of the sorting mechanism with the mass conditions encountered in the field. It will be understood that by tilting the outboard edge 16 of the table upwardly a critical angle of inclination toward the discharge edge of the table may be established whereat inertia forces and frictional forces tending to hold the potatoes to the moving surface of the table are substantially neutralized or overcome to facilitate rolling out the potatoes from the aggregate. It will be readily understood that under certain conditions the table would have to be inclined at a greater angle than under very light conditions and that this angle is determined by the actual trial in the field such that all of the aggregate will not slide off the discharge edge 21 of the conveyor and yet be sufficiently steep enough to effect ready separation and obtain good rolling action of the potatoes laterally across the conveyor belt.

In addition to the flail assembly, the separator mechanism comprises a series of hurdles 60, 60 placed longitudinally in the direction of travel of the bottom run 61 of the flail assembly which sweeps laterally across the top run 9 of the apron from the edge 16 to the edge 21 thereof, and these hurdles are preferably located in the area intermediate the longitudinal medial line of the table and its discharge edge 21 and are constituted each of a rod comprising a bottom cross-piece 62 (Fig. 2) extending over the surface 9 adjacent thereto and presenting a height such that the flays 28 sweep and tumble the potatoes thereover while said cross-bars stop stones and dirt and the like, in view of the fact that the stones are flat and will not roll over and the dirt will pack thereagainst. The cross-bars 62 extend transversely of the direction or orbital path of the flay assembly and at opposite ends project outwardly of the frame-members 22 and 23 and at said end each has upstanding legs 63, 63 which slidably project through guides 64, 64 connected to the members 22 and 23. The upper ends of the legs 63, 63 are provided with eyes 64' through adjacent of which extends rod 65, the rod 65 which extends through the eyes of adjacent legs 63 projects at opposite ends into vertically elongated slots 66 in brackets 67, 67 mounted upon the related member 22 or 23.

A parallelogram linkage generally designated 68 is carried by each member 22 and 23 and each linkage comprises a pair of parallel members 69, 69 spaced longitudinally of the member 22 or 23 and pivoted thereto at their lower ends as at 70, the links 69, 69 being pivoted as at 72, 72 to spools 73, 73 sleeved on the adjacent rod 65 spaced longitudinally thereof. It will be noted that one of the link members 69 extends upwardly from the point 72 and provides a convenient handle for manipulation. It will be appreciated that the parallelogram linkage will effect parallel up and down movement of the hurdle assembly constituted of the hurdle members 60, 60.

The table at its end 10 from the side 31 of the separator is provided with a baffle 75 which may be carried from the side board 13, the baffle 75 extending from the edge 13 at the side 31 of the separator and angling in the direction toward the discharge end of the conveyor in converging relationship to the edge 21 thereof. The function of the baffle 75 which extends upwardly over the surface 9 in intercepting relationship to the aggregate moving out from under the separator is to funnel it into a chute 76 which discharges the aggregate upon the ground. It will be noted that the edge 21 of the conveyor at the end 10 thereof and the portion in alignment with the separator 17 has a discharge into a receiving means 77 in the nature of an elevator conveyor for delivering the potatoes to associated receptacles such as bags or a truck.

The drive for the various components herein described may commence from associated mechanism transmitting drive through a shaft 79 and a sprocket and chain assembly 80 to a counter-shaft 81 which may be supported from the framework 40 beneath the portion 10 of the table, the shaft 81 provided with a gear 82 meshing with a gear 83 keyed to a shaft 84 of the roll 12 and driving the apron 7 in the direction of the arrow. The shaft 84 is provided with a sprocket 85 driving through a chain and sprocket assembly 86 and a gear train 87 the shaft 23' of the flail assembly whereat it orbits in the directions of the arrows. The component 4 will be driven from the same source through a chain and sprocket assembly 88.

The entire machine of which this invention is a component is shown and described in a companion application filed in the name of Russell R. Raney, et al., entitled Potato Harvester, filed December 2, 1952, Serial No. 323,535 and now Patent No. 2,726,501.

I claim:

1. In a potato harvester separating mechanism for sorting potatoes from a dirt and stone and the like aggregate, a frame, a conveyor carried thereby comprising a generally horizontal apron having a top run with longitudinally spaced receiving and discharge areas and movable to transport aggregate deposited thereupon from said receiving to said discharge area, a separator structure above the conveyor disposed in a position between said areas and including an endless yieldable flail assembly having an endless path and including sweeping means having a portion in said path disposed in sweeping relationship to said top run and movable transversely thereof from one lateral edge to the other thereof and adapted to tumble the potatoes out of the aggregate, and a series of hurdles carried by the structure and extending generally parallel to the direction of movement of said run and transversely to the direction of movement of said portion of said flail assembly, sweeping means athwart the same and spaced slightly above said top run and affording a plurality of obstacles to the aggregate being swept thereagainst by said flail assembly, sweeping means to stop stones and dirt while the potatoes tumble thereover.

2. A sorting device for harvested potatoes and the like adapted to receive thereon rocks and clods of earth and other debris along with the potatoes to be separated therefrom, comprising a platform member having a moving surface adapted to advance the material deposited thereon to a position for discharging the material upon the ground, and a driven assembly mounted upon the platform in intercepting relationship to the material deposited upon the moving surface thereof, said assembly having a part thereon adapted to engage the material and movable in a path transversely of said surface at an angular velocity such that said part is caused to strike the potatoes and roll them in a lateral direction transversely of the direction of travel of the platform surface, a hurdle, means mounting the hurdle slightly above said surface athwart said path of said part and said direction of movement of the potatoes and positioned at a height above the surface to permit the potatoes to roll thereover while obstructing such movement of the stones and debris.

3. A sorting device for harvested potatoes and the like adapted to receive thereon rocks and clods of earth and other debris along with the potatoes to be separated therefrom, comprising a platform member having opposite lateral edges and a surface therebetween adapted to advance the material thereon from one area to another spaced longitudinally thereof, an endless drive assembly mounted upon the platform over said surface and having a path moving in a direction angularly as respects the direction of movement of said surface and comprising a series of outwardly projecting flexible members, said assembly having a rectilinear length disposed above said surface between said areas and extending from one lateral edge to the other and the members thereof along said length extending toward said surface in combing relation with and in the path of the material deposited upon the moving surface of the platform member, said endless assembly having an extensive active quadrangular area along said length superposed with respect to said surface and extending dimensionally parallel with and transversely to said direction of movement of said surface and having movement at a velocity such as to drag and roll the potatoes in a direction transverse to the direction of travel of the platform surface for the major portion of the width of said surface upon engagement of the members of the assembly with the potatoes in the material passing thereunder, and said assembly comprising a hurdle extending generally parallel to the direction of movement of the platform surface closely thereto and disposed between said rectilinear length and said surface in the path of movement of said members along said length and at a height intermediate the ends of said members in said length.

4. A sorting device for harvested potatoes and the like adapted to receive thereon rocks and clods of earth and other debris along with the potatoes to be separated therefrom, comprising a platform member having opposite lateral edges and a surface therebetween adapted to advance the material thereon from one area to another spaced longitudinally thereof, an endless drive assembly mounted upon the platform over said surface and having a path moving in a direction angularly as respects the direction of movement of said surface and comprising a series of outwardly projecting flexible members, said assembly having a rectilinear length disposed above said surface between said areas and extending from one lateral edge to the other and the members thereof along said length extending toward said surface in combing relation with and in the path of the material deposited upon the moving surface of the platform member, said endless assembly having an extensive active quadrangular area along said length superposed with respect to said surface and extending dimensionally parallel with and transversely to said direction of movement of said surface and having movement at a velocity such as to drag and roll the potatoes in a direction transverse to the direction of travel of the platform surface for the major portion of the width of said surface upon engagement of the members of the assembly with the potatoes in the material passing thereunder, and said assembly comprising a series of hurdle elements elongated longitudinally as respects to the direction of travel of said surface and positioned slightly above the surface between said length and said surface and at a height in the path of movement of said members along said length, said members along said length adapted to sweep over said hurdles and said hurdles having an extent away from the surface such as to permit potatoes to tumble thereover while substantially stopping the other debris.

5. A device according to claim 3 and said hurdles spaced transversely of the movement of said surface a sufficient distance therebetween to prevent the material from bridging the spaces therebetween as it is swept by said members thereacross.

6. A device according to claim 3 and means adjustably mounting each hurdle for positioning the same closer or farther as respects to said surface.

7. A sorting device for harvested potatoes and the like adapted to receive thereon rocks and clods of earth and other debris along with the potatoes to be separated therefrom, comprising a platform having laterally spaced sides and longitudinally spaced ends and further having a rectilinear movable substantially flat surface adapted to receive near one end and at one side of the platform material deposited thereon and to advance the material toward the other end of the platform, a framework carried by the platform, a separator comprising a plurality of laterally spaced shafts mounted on the framework above the platform generally parallel thereto, sprockets keyed to the shafts, a flail assembly comprising endless chains encircling both shafts and trained about companion sprockets of respective shafts, a plurality of cross-members interconnecting the chains, a plurality of outstanding flexible flails on each cross-member of a character sufficient to yield upon encountering an obstruction of beyond a predetermined magnitude, said flail assembly having a stretch disposed intermediate the ends of said assembly angularly to the direction of movement of said surface thereabove and movable across said surface from said one side to the opposite side thereof, said flails depending from said stretch to adjacent said surface and adapted to brush through the material and sweep out the potatoes therefrom by rolling them transversely across said surface.

8. A sorting device according to claim 7, and said flail assembly disposed transversely of said surface and having a first side adjacent to said one end of said platform and a second side adjacent to said other end of said platform, said flails on each crossmember being spaced from each other longitudinally of the associated member and the spacing between adjacent flails progressively increasing from said first toward said second side of said assembly.

9. A sorting device according to claim 8 and a baffle carried by the platform at said one end thereof and extending angularly across said surface from said opposite side of the surface to adjacent said one side of said surface in converging relationship therewith toward said other end of said surface and positioned in intercepting relationship to the material moving from said one end of said surface and under said separator to funnel the material toward said one side of said surface.

10. A sorting device for harvested potatoes adapted to receive thereupon stones and clods of earth and other debris along with the potatoes to be separated therefrom, comprising a platform member having a moving surface adapted to advance the material in a given direction, means associated with said platform member for selectively intercepting the potatoes thereon and moving them laterally of said platform off one edge thereof, and a hurdle supported above the surface and elongated generally in said given direction of movement of the surface and having a margin remote from the surface disposed at a distance therefrom less than the transverse dimension of potatoes intended to hurdle the same for permitting such potatoes to roll thereover said hurdle positioned before said edge and athwart as respect to the direction of movement of the potatoes by said means.

11. In a sorting device, an endless flail assembly having a rectilinear run, a supporting framework for the assembly comprising a pair of beams at opposite sides of said run, and a series of U-shaped hurdle members carried upon the framework and each comprising a pair of legs and an intermediate bight portion extending transversely to said run of said flail assembly in obstructing relationship to the peripheral sweep of the flails thereof, and said legs connected to respective beams.

12. In a sorting device according to claim 11, and a parallelogram linkage supporting said hurdle members on the framework for positioning the members with their portions closer or farther with respect to the peripheral path of said flail assembly in said run.

13. A sorting device comprising a platform having an endless apron presenting a run adapted to receive an aggregate of stones, and dirt and other debris along with potatoes to be separated therefrom, means for moving said apron in a given direction for transporting the aggregate thereon from one end toward the other thereof, a separator superposed with respect to said apron between said ends and comprising means having a length extending transversely of said apron and having a plurality of depending fingers disposed to comb through the aggregate passing therebeneath, means for moving said fingers along said length in a direction from one lateral edge of said apron toward the other for combing potatoes out of the aggregate by rolling them laterally of the apron toward said other edge thereof, means pivotally supporting said separator on an axis extending transversely of said length thereof, and means for selectively swinging said separator to a plurality of angular positions with respect to the plane of said run of said apron transversely thereof whereby said separator along said length may be disposed parallel to said run of said apron so that all of said fingers have their lower extremities spaced substantially the same distance to said run for dragging potatoes through an aggregate of heavy mass or said length may be disposed at an upward inclination toward said other edge of the apron so that the lower ends of the fingers adjacent said one edge of the run are disposed closest to the apron and increasingly spaced toward the said other edge whereby in conditions of an aggregate light mass the potatoes are lightly pushed across the apron.

14. A separating mechanism comprising a conveyor having receiving and delivery ends and a sorting mechanism superposed with respect to the conveyor and having an expanse extending in the direction of delivery of the conveyor as well as transversely thereof, said mechanism including a plurality of dependent fingers, means supporting and moving said fingers to rake through the material moving therebeneath on the conveyor and rake out selected particles by sweeping such particles laterally toward one side of the conveyor, said fingers arranged in a greater density per unit of area adjacent the receiving end of the conveyor and in lesser density adjacent the delivery end of the conveyor and said fingers having support points substantially more closely spaced at the receiving end than at said delivery end and said fingers having operative ends spaced farther apart at the delivery end of the conveyor than at the receiving end whereby said mechanism is more aggressive in spreading and combing through the material laterally of the conveyor adjacent said receiving end and less so at the delivery end of the conveyor.

15. A sorting device for harvested potatoes and the like adapted to receive thereon rocks and clods of earth and other debris along with the potatoes to be separated therefrom, comprising a platform member having opposite lateral edges and a surface therebetween adapted to advance the material thereon from one area to another spaced longitudinally thereof, an endless drive assembly mounted upon the platform over said surface and having a path moving in a direction angularly as respects the direction of movement of said surface and comprising a series of outwardly projecting flexible members, said assembly having a rectilinear length disposed above said surface between said areas and extending from one lateral edge to the other and the members thereof along said length extending toward said surface in combing relation with and in the path of the material deposited upon the moving surface of the platform member, said endless assembly having an extensive active quadrangular area along said length superposed with respect to said surface and extending dimensionally parallel with and transversely to said direction of movement of said surface, means moving said fingers the entire width of the conveyor, and said quadrangular area extending entirely across the width of the conveyor and the width of said quadrangular area being substantially equal to the width of the conveyor and the length of the quadrangular area being at least equal to the width, said fingers moving at a velocity such as to drag and roll the potatoes in a direction transvesre to the direction of travel of the platform surface for the major portion of the width of said surface upon engagement of the members of the assembly with the potatoes in the material passing therebeneath, and said fingers under static condition spaced farther apart adjacent to said other area of the conveyor and closer adjacent to said one area of the conveyor.

References Cited in the file of this patent

UNITED STATES PATENTS

| | | |
|---|---|---|
| 229,602 | Gray | July 6, 1880 |
| 494,684 | Nicholson | Apr. 4, 1893 |
| 1,124,486 | Maull | Jan. 12, 1915 |
| 1,141,852 | Sutton | June 1, 1915 |
| 1,389,789 | Stephens et al. | Sept. 6, 1921 |
| 2,068,101 | Freund | Jan. 19, 1937 |
| 2,114,263 | Heaslet | Apr. 12, 1938 |
| 2,277,450 | Parr | Mar. 24, 1942 |
| 2,458,224 | Thompson | Jan. 4, 1949 |
| 2,468,639 | Sample | Apr. 26, 1949 |
| 2,656,921 | Gray | Oct. 27, 1953 |
| 2,657,798 | Young | Nov. 3, 1953 |